(12) United States Patent
Zeller-Pendrey

(10) Patent No.: US 8,008,422 B2
(45) Date of Patent: Aug. 30, 2011

(54) CURABLE RESIN COMPOSITION

(75) Inventor: Jeanine I. Zeller-Pendrey, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 447 days.

(21) Appl. No.: 12/171,821

(22) Filed: Jul. 11, 2008

(65) Prior Publication Data

US 2010/0010190 A1 Jan. 14, 2010

(51) Int. Cl.
*C08G 18/06* (2006.01)
*C08G 18/32* (2006.01)
*C08G 59/17* (2006.01)
*C08G 2/00* (2006.01)
*C08G 2/22* (2006.01)

(52) U.S. Cl. .............. 528/65; 528/44; 528/85; 528/246; 528/250; 528/272; 528/486; 525/330.9

(58) Field of Classification Search .................. 528/246, 528/250, 44, 65, 85, 272, 486; 525/330.9
See application file for complete search history.

(56) References Cited

U.S. PATENT DOCUMENTS

| | | | |
|---|---|---|---|
| 3,527,720 | A | 9/1970 | Groff et al. |
| 4,267,288 | A | 5/1981 | Burkhart et al. |
| 4,923,934 | A | 5/1990 | Werner et al. |
| 4,985,475 | A | 1/1991 | Croft et al. |
| 6,893,696 | B2 | 5/2005 | Hansen et al. |

*Primary Examiner* — Duc Truong
(74) *Attorney, Agent, or Firm* — Melanie G. Govar

(57) ABSTRACT

In general, the invention provides curable resin compositions that may be used to rebuild insulation and/or to provide environmental protection for cable splices, potted articles, and the like. The curable resin compositions can be curable at room temperature. The components used to form and cure the resin compositions may be provided in two or more parts. In specific embodiments, the invention provides curable resin compositions having anhydride, polyol, epoxy, and urethane components.

19 Claims, No Drawings

CURABLE RESIN COMPOSITION

BACKGROUND

The present invention relates to resin compositions. More specifically, the invention relates to compositions that include a curable resin and that may, among other applications, be used to repair damaged insulation and/or to provide environmental protection for encapsulated articles and cable or wire splices.

Resins have been used in power, utility and telecommunications applications to seal, provide environmental protection, and repair damaged insulation around encapsulated articles and cable or wire splices. In telecommunication applications, signal transmission devices (such as electrical and optical cables) typically include a plurality of individual connectors, each of which conduct a signal.

Resins commonly are available in two or more parts or components. The ingredients of the components (often held in separated compartments) are mixed and reacted together and applied over a signal transmission device or cable splice or a portion thereof. The ingredients then inter-react to form a resin, often including a cross-linking to cure the resin.

Some existing resins include one or more urethane, epoxy or polyester components. While many urethane-based resins enjoy a low production cost, urethane-based resins contain isocyanate functional groups, which suffer myriad drawbacks. Some users of commercial resins can be chemically sensitized to isocyanate-containing compounds, and urethane-based compositions generally exhibit a tendency to foam in the presence of water.

Epoxy-based resins are generally resilient, but suffer high production costs and may exhibit an exothermic reaction during resin formation. Cable splices, conduits, insulation, connecting devices and cable terminating components may thereby be damaged as a result of application of the resin. Polyester-based resins can have low production costs, but generally exhibit low hardness and resilience and have a Shore A hardness typically no more than about 20.

Because of these various drawbacks in conventional resin materials, there is a need for a resin composition that is hydrolytically stable, exhibits increased hardness, resiliency and a reduced cost of production. There is also a desire for an environment-friendly resin that has a low exotherm.

SUMMARY

Various embodiments of the present invention provide compositions for a curable resin that may be used to repair damaged insulation and/or to protect cable splices, conduits and similar devices and structures. In one aspect, the resin compositions of the invention generally include at least one anhydride functionalized compound having anhydride reactive sites, a polyol-functionalized compound having polyol reactive sites, an epoxy functionalized compound having epoxy reactive sites, a urethane polyol functionalized compound, and a catalyst.

In another aspect, a curable resin composition kit is provided that includes a first compartment comprising at least one anhydride functionalized compound having anhydride reactive sites and at least one epoxy functionalized compound having epoxy reactive sites; and a second compartment comprising at least one polyol functionalized compound having reactive polyol sites and at least one urethane polyol functionalized compound having urethane polyol reactive sites.

In yet another aspect, a method of encapsulating a signal transmission device is provided that includes providing a signal transmission device and a kit comprising a first compartment comprising at least one anhydride functionalized compound having anhydride reactive sites and at least one epoxy functionalized compound having epoxy reactive sites and a second compartment comprising at least one polyol functionalized compound having reactive polyol sites, at least one urethane polyol functionalized compound having urethane polyol reactive sites, and a catalyst; mixing the components of the first compartment with the components of the second compartment to form a reactive mixture; and applying the reactive mixture to the device.

In various embodiments of the invention, the components of the curable resin compositions of the invention may be provided in two or more parts. The components can be allowed to mix and inter-react to form and cure the resin composition. In some embodiments, the resin compositions of the invention generally are curable at room temperature.

Various embodiments of the present invention provide curable resin compositions that are hydrolytically stable, have an increased hardness, exhibit low or no exotherm, are resilient and are manufacturable at comparatively lower cost.

DETAILED DESCRIPTION

Various embodiments of the present invention provide compositions of a curable resin for encapsulating signal transmission devices or encapsulated articles. The compositions may be used to repair damaged insulation and/or to provide environmental protection for components to which they are applied.

The resin compositions of the invention, when cured, generally include at least one anhydride functionalized compound having anhydride reactive sites, a polyol functionalized compound having polyol reactive sites, an epoxy functionalized compound having epoxy reactive sites, a urethane polyol functionalized compound and a catalyst. In various embodiments, the components forming the resin compositions of the invention may be provided in two or more compartments. The two of more compartments are isolated from one another prior to forming a resin.

The curable resin compositions of the invention generally includes least one anhydride functionalized compound having anhydride reactive sites. Polymers, oligomers, or monomers which have reactive anhydride sites are useful as the anhydride functionalized compound. Examples of anhydride functionalized compounds suitable for use in forming the curable resin compositions of the invention include styrene maleic anhydrides (sma), poly(methyl vinyl ether-co-maleic anhydride) (such as GANTREZ AN 119 available from ISP), polybutadiene grafted with maleic anhydride (such as the "RICON MA" product line from Sartomer and the "LITHENE" product line from Synthomer) and combinations thereof. The anhydride functionalized compound can be present in an amount from between about 30 weight percent (wt %) and about 60 wt % based on the total weight of the resin.

The curable resin also can include at least one polyol functionalized compound having polyol reactive sites. Polymers, oligomers, or monomers which have reactive polyol sites are useful as the polyol functionalized compound. Examples of polyol functionalized compounds suitable for use in forming the curable resin compositions of the invention include castor oil polyols, such as CASPOL 5004, POLYCIN M365 and the like. The polyol functionalized compound can be present in an amount between about 10 wt % and about 25 wt % based on the total weight of the resin.

The curable resin composition can also include an epoxy functionalized compound having epoxy reactive sites. Polymers, oligomers, or monomers which have reactive epoxy sites are useful as the epoxy functionalized compound. Examples of epoxy functionalized compounds suitable for use in forming the curable resin compositions of the invention include bis-phenol-a-epoxy (EPON 828 or 2-[[4-[2-[4-(oxiran-2-ylmethoxy)phenyl]propan-2-yl]phenoxy]methyl]oxirane), soya bean oil, linseed oil and combinations thereof. The epoxy functionalized compounds can be present in an amount between about 15 wt % and about 40 wt % based on the total weight of the resin composition.

The resin composition can include at least one urethane polyol functionalized compound having reactive urethane polyol sites. Polymers, oligomers, or monomers which have reactive urethane and polyol sites are useful as the urethane polyol functionalized compound of the invention. Examples of urethane polyol functionalized compounds suitable for use in forming the curable resin compositions of the invention include urethane-diols (such as the commercially available KFLEX UD320-100), polyurethane diols and combinations thereof. The urethane polyol functionalized compound can be present in an amount between about 5 wt % and about 15 wt % based on the total weight of the resin composition.

In various embodiments of the invention, a catalyst can be used to accelerate the reaction process and cure the resin composition. Examples of compounds suitable for use as the catalyst include amines, tin and combinations thereof. In various embodiments of the invention, a tertiary amine (such as DMP 30/2,4,6-tris (dimethylaminomethyl) phenol) may be used as the catalyst. The catalyst can be present in an amount greater than 0 wt % but less than or equal to about 25 wt % based on the total weight of the resin composition. In some embodiments, the resin composition is curable at room temperature. In other embodiments, the resin composition may be cured at an increased temperature.

In various embodiments, these components may be provided in two or more compartments, which are isolated from each other prior to forming and curing the resin. The compartments may be mixed by rupturing a seal and allowing the components to mix and inter-react to form and cure the resin. Various compositions of the resin are curable at room temperature. In an embodiment of the invention, the resin may be cured by application of increased temperature, the use of a catalyst and the like.

In various embodiments, the components forming the resin composition may be provided in two or more parts, or compartments. For example, at least one anhydride functionalized compound and at least one epoxy functionalized compound may be provided in one compartment. Another compartment may include at least one polyol functionalized compound and at least one urethane polyol functionalized compound. The catalyst can be provided in either compartment but is usually provided in the compartment that also contains the polyol. It is important to keep reactive species separated in separate compartments. For example, one of ordinary skill in the art would know to keep the polyol functionalized compound separate from the anhydride functionalized compound.

In some embodiments of the invention, the two parts of the resin can be poured into two separate compartments separated by a sealing layer. The sealing layer can be composed or comprise of a material made of micro-fibers and function as a rupturable seal. The rupturable seal can be broken by the application of force, allowing the components of both compartments to mix and inter-react. A more detailed description of a suitable two-part delivery device may be found in U.S. Pat. No. 6,893,696 (Hansen et al.), entitled "Rupturable Seal," which description is hereby incorporated by reference for such purpose.

In various embodiments of the invention, when the components of the at least two compartments are allowed to mix and inter-react, an alcohol condensation reaction of one or more materials comprising an anhydride functional group may form an ester component of the resin composition. For example, one or more materials comprising an anhydride functional group may react with a material comprising a polyol functional group to form an ester functionalized compound. In various embodiments of the invention, the ester functionalized compound may include a polyester based compound. One or more materials comprising an anhydride functional group further react with the urethane polyol functionalized compound to provide urethane. Further, a half-acid generated from the alcohol condensation reaction may react with the epoxy and urethane to form the epoxy and urethane components of the resin composition, thereby imparting polyester, epoxy and urethane characteristics to the composition.

The resin, when cured, may be used as an encapsulant in a signal transmission device, for example a cable splice. In various embodiments, a cable splice may include an enclosure, at least one signal conductor and at least one connecting device. The signal conducting device may be capable of transmitting a signal, for example, an electrical signal, and optical signal or the like.

The cured resin composition can have a Shore A hardness between about 30 and about 90, between about 50 and about 90, or even between about 70 and about 90. The cured composition can have a tensile strength between about $1.03 \times 10^6$ $N/m^2$ and about $4.13 \times 10^6$ $N/m^2$. The cured composition can have a dielectric breakdown voltage between about $78 \times 10^5$ V/m and about $177 \times 10^5$ V/m.

Objects and advantages of this invention are further illustrated by the following examples, but the particular materials and amounts thereof recited in these examples, as well as other conditions and details, should not be construed to unduly limit this invention.

EXAMPLES

The following list of commercially available compounds was used in the examples to follow in varied proportions. Table 1 lists the function, or functionality, of each compound, indicated as follows:

| | |
|---|---|
| "AFC" | Anhydride Functionalized Compound |
| "EFC" | Epoxy Functionalized Compound |
| "PFC" | Polyol Functionalized Compound |
| "UPFC" | Urethane-Polyol Functionalized Compound |
| "S" | Solvent |
| "CA" | Catalyst |
| "P" | Plasticizer |

In practice, components such as those listed in Table 1 may be used together in varied proportions and provided in two or more parts. The two or more parts may be mixed together to form and cure the resin composition. In various embodiments of the invention, the resin composition may be cured at room temperature. In some embodiments, however, the resin composition may be cured at an increased temperature to quicken the curing process.

TABLE 1

Component Table

| Materials | Description | Source | Function |
|---|---|---|---|
| Gantrez AN 119 | Poly(methylvinylether/maleic anhydride) | ISP Corp. | AFC |
| Polybutadiene 35% Functionalized Maleic Anhydride (Ricon MA, Lithene) | Polybutadiene backbone grafted with maleic anhydride having 35% functionality | Sartomer Synthomer | AFC |
| EPON 828 | Bis-phenol-A-epoxy (2-[[4-[2-[4-(oxiran-2-ylmethoxy)phenyl] propan-2-yl]phenoxy]methyl]oxirane) | Resolution Performance Products | EFC |
| DMP 30 | 2,4,6-tris (dimethylaminomethyl) phenol, epoxy accelerator | Near Chemical Specialties, Inc. | CA |
| RUETASOLV DI | Bis(isopropyl)naphthalene | Rütgers Kureha Solvents GmbH | S |
| KFLEX UD 320-100 | 100% Active Urethane Diol | King Industries | UPFC |
| NEVCHEM LR | Hydrocarbon resin solution | Neville Chemicals | S |
| CASPOL 5004 | Polyol with high level of primary hydroxyls | Caschem, Inc. | PFC |
| PLASTHALL S-73 | Epoxidized 2-ethylhexyl tallate, epoxy ester plasticizer | The C. P. Hall Company | P |
| VIKOFLEX 7170 | Epoxidized Soya Bean Oil | Atofina Chemicals Inc. | EFC |
| SMA 2625P | Styrene maleic anhydride copolymer | Sartomer | AFC |
| XM 308 | Polyester polyol | King Industries | Polyol |
| POLYCIN M365 | Castor oil polyol | Caschem | Polyol |

For the Examples illustrated below, one or more of the components listed in Table 1 were used in varied proportions, and several curable resin compositions were obtained. Tables 2, 3 and 4 provide a list of components and their proportions, by weight of the total resin, used in the examples elaborated thereon. The provided examples illustrate a two-part curable resin composition. It will be understood, however, that the components may also be provided in more than two parts, which may be mixed together to form and cure the resin composition.

TABLE 2

Example 1

| Component | Weight Percent (of total batch) | Equivalent weight (mol fraction) |
|---|---|---|
| Part A | | |
| Polybutadiene 35% Functionalized Maleic Acid | 30 | 0.4 |
| GANTREZ AN 119 (30% suspension in Ruetasolv DI) | 19.7 | 0.59 |
| NEVCHEM LR (naphthene) | 18.4 | — |
| EPON 828 | 35.7 | 0.69 |
| Part B | | |
| RUETASOLV DI | 14.7 | — |
| NEVCHEM LR | 25.4 | — |
| KFLEX UD 320-100 | 9.2 | 0.34 |
| CASPOL 5004 | 9.7 | 0.33 |
| POLYCIN M365 | 5.2 | 0.3 |
| DMP 30 | 7 | — |

Example 1

A curable resin composition according to the present invention was prepared in two parts, Part A and Part B respectively, as shown above in Table 2. Part A of the resin composition was formed as follows. Firstly, 30 parts of polybutadiene grafted with maleic acid having 35 percent functionality was mixed with 19.7 parts of GANTREZ AN 119 (formed as a 30 percent suspension in RUETASOLV DI), 18.4 parts of NEVCHEM LR and 35.7 percent of Epon 828. The combination was mixed until the mixture appeared homogenous.

Part B of the resin composition was formed by mixing 14.7 parts of RUETASOLV DI, 25.4 parts of NEVCHEM LR, 9.2 parts of KFLEX UD 320-100, 9.7 parts of CASPOL 5004, 5.2 parts of POLYCIN M365 and 7 parts of DMP 30. The combination was mixed until the mixture appeared homogenous.

At a temperature of 23° C., the two parts of the curable resin composition took about 20 minutes to cure. Example 1, illustrated above provided a cured resin having a tensile strength of about $2.84 \times 10^6$ N/m², a dielectric strength of about $13.5 \times 10^5$ V/m and a Shore A hardness of about 80.

TABLE 3

Example 2

| Component | Weight Percent (of total batch) |
|---|---|
| Part A | |
| Polybutadiene 35% maleic acid functionalized | 31.6 |
| SMA 2625P | 7.2 |
| VIKOFLEX 7170 | 33 |
| EPON 828 | 14.4 |
| Part B | |
| XM 308 | 3 |
| KFLEX UD 320-100 | 6.8 |
| DMP 30 | 3.2 |

Example 2

A curable resin composition according to the present invention was prepared in two parts, Part A and Part B, as follows. Firstly, 31.6 parts of polybutadiene grafted with maleic acid having 35 percent functionality was mixed with 7.2 parts of SMA 2625P, 33 parts of VIKOFLEX 7170, and 14.4 parts of EPON 828. The composition was stirred until the mixture appeared homogenous.

Part B was prepared by mixing 3 parts of XM308, 6.8 parts of KFLEX UD 320-100, and 3.2 parts of DMP 30 and stirred until the mixture appeared homogenous.

The two parts of the curable resin composition, Part A and Part B, were poured into separate, isolated compartments. At a later time, Part A and Part B were allowed to combine and cure at room temperature to provide a cured resin composition. The cured composition had a tensile strength between about $0.68 \times 10^6$ N/m$^2$ and about $1.37 \times 10^6$ N/m$^2$, a dielectric strength of about $98.5 \times 10^5$ V/m and a Shore A hardness of between about 35 and about 45.

TABLE 4

Example 3

| Component | Weight Percent (of total batch) |
|---|---|
| Part A | |
| Polybutadiene 35% maleic acid functionalized | 47.6 |
| GANTREZ AN 119 | 3.4 |
| RUETASOLV DI | 13.7 |
| EPON 828 | 15.3 |
| Part B | |
| KFLEX UD 320-100 | 13.6 |
| PLASTHALL S-73 | 1.61 |
| DMP 30 | 4.8 |

Example 3

A curable resin composition according to the present invention was prepared in two parts, Part A and Part B, as follows. Part a was prepared by mixing 47.6 parts of polybutadiene grafted with maleic acid having 35 percent functionality with 3.4 parts of GANTREZ AN 119, 13.7 parts of RUETASOLV DI and 15.3 parts of Epon. The composition was stirred until the mixture appeared homogenous.

Part B was prepared by mixing 13.6 parts of KFLEX UD 320-100 with 1.61 parts of Plasthall S-73, 4.8 parts of DMP 30 and stirred until the resulting mixture appeared homogenous.

The two parts of the curable resin composition, Part A and Part B, were poured into separate, isolated compartments.

At a later time, Part A and Part B were allowed to combine and sure at room temperature to provide a cured resin composition. The cured composition had a tensile strength of between about $0.58 \times 10^6$ N/m$^2$ and about $1.05 \times 10^6$ N/m$^2$, a dielectric strength between about $90.5 \times 10^5$ V/m and about $130 \times 10^5$ V/m, and a Shore A hardness between about 79 and about 89.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A two-part curable resin composition comprising:
    a first part comprising
        at least one anhydride functionalized compound having anhydride reactive sites; and
        an epoxy functionalized compound having epoxy reactive sites; and
    a second part comprising
        a polyol functionalized compound having polyol reactive sites;
        a urethane polyol functionalized compound;
    wherein the first part or second part further comprises a catalyst; and
    wherein the composition cures when the first and second parts are mixed together.

2. The resin composition of claim 1 being curable at room temperature.

3. The resin composition of claim 1, wherein the at least one anhydride functionalized compound is selected from the group consisting of: styrene maleic anhydrides, poly(methyl vinyl ether-co-maleic anhydride), polybutadiene grafted with maleic anhydride, and combinations thereof.

4. The resin composition of claim 1, wherein the at least one anhydride functionalized compound is present in an amount between about 30 weight percent (wt %) and about 60 wt % based on the total weight of the resin.

5. The resin composition of claim 1, wherein the polyol functionalized compound is present in an amount between about 10 wt % and about 25 wt % based on the total weight of the resin.

6. The resin composition of claim 1, wherein the epoxy functionalized compound is selected from the group consisting of: bis phenol A epoxy, epoxidized soya bean oil, epoxidized linseed oil, and combinations thereof.

7. The resin composition of claim 1, wherein the epoxy functionalized compound is present in amount between about 15 wt % and about 40 wt % based on the total weight of the resin composition.

8. The resin composition of claim 1, wherein the urethane polyol functionalized compound is selected from the group consisting of: urethane-diol, polyurethane diol and combinations thereof.

9. The resin composition of claim 1, wherein the urethane polyol functionalized compound is present in an amount between about 5 wt % and about 15 wt % based on the total weight of the resin composition.

10. The resin composition of claim 1 wherein the catalyst comprises a tertiary amine.

11. The resin composition of claim 1, wherein the catalyst is present in an amount greater than 0 wt % but less than or equal to about 25 wt % based on the total weight of the resin composition.

12. The resin composition of claim 1 having a Shore A hardness between about 70 and about 90.

13. The resin composition of claim 1 having a dielectric breakdown voltage between about $78 \times 10^5$ V/m and about $177 \times 10^5$ V/m.

14. The resin composition of claim 1 having a tensile strength between about $1.03 \times 10^6$ N/m$^2$ and about $4.13 \times 10^6$ N/m$^2$.

15. An encapsulant for s signal transmission device comprising a resin composition according to claim 1.

16. A curable resin composition kit, the kit comprising:
    a first compartment comprising:

at least one anhydride functionalized compound having anhydride reactive sites; and at least one epoxy functionalized compound having epoxy reactive sites; and a second compartment comprising:

at least one polyol functionalized compound having reactive polyol sites; and at least one urethane polyol functionalized compound having urethane polyol reactive sites.

17. The kit of claim 16 wherein the second compartment further comprises a catalyst.

18. A method of encapsulating a signal transmission device comprising:

providing a signal transmission device and a kit comprising:

a first compartment comprising:

at least one anhydride functionalized compound having anhydride reactive sites; and at least one epoxy functionalized compound having epoxy reactive sites; and a second compartment comprising:

at least one polyol functionalized compound having reactive polyol sites; and at least one urethane polyol functionalized compound having urethane polyol reactive sites; and a catalyst;

mixing the components of the first compartment with the components of the second compartment to form a reactive mixture; and applying the reactive mixture to the device.

19. The method according to claim 18 wherein the device comprises a cable.

* * * * *